United States Patent
Frey et al.

(10) Patent No.: US 12,200,290 B2
(45) Date of Patent: Jan. 14, 2025

(54) INFORMATION PROCESSING SYSTEM AND INFORMATION PROCESSING METHOD

(71) Applicant: Sony Group Corporation, Tokyo (JP)

(72) Inventors: Matthias Frey, Stuttgart (DE); Nabil Loghin, Stuttgart (DE); Nicolas Pierre Rose, Basingstoke (GB)

(73) Assignee: SONY GROUP CORPORATION, Tokyo (JP)

( * ) Notice: Subject to any disclaimer, the term of this patent is extended or adjusted under 35 U.S.C. 154(b) by 73 days.

(21) Appl. No.: 17/880,657

(22) Filed: Aug. 4, 2022

(65) Prior Publication Data
US 2023/0046493 A1 Feb. 16, 2023

(30) Foreign Application Priority Data
Aug. 11, 2021 (EP) .................................... 21190771

(51) Int. Cl.
*H04N 21/43* (2011.01)
*G06V 10/764* (2022.01)
(Continued)

(52) U.S. Cl.
CPC ..... *H04N 21/43074* (2020.08); *G06V 10/764* (2022.01); *G06V 20/42* (2022.01); *H04N 21/44008* (2013.01); *H04N 21/4532* (2013.01)

(58) Field of Classification Search
CPC ....... H04N 21/43074; H04N 21/44008; H04N 21/4532; H04N 21/21805; H04N 21/4394;
(Continued)

(56) References Cited

U.S. PATENT DOCUMENTS 11,178,447 B1 * 11/2021 Panter ............. H04N 21/42203
2008/0068507 A1   3/2008 Krause et al.
(Continued)

FOREIGN PATENT DOCUMENTS

WO   WO-2022181859 A1 * 9/2022

OTHER PUBLICATIONS

Chinese Publication CN112449285 Mar. 2021 (Year: 2021).*
(Continued)

*Primary Examiner* — Loi H Tran
(74) *Attorney, Agent, or Firm* — XSENSUS LLP

(57) ABSTRACT

An information processing system for obtaining an audio content file for video data providing video content representing a sport event, including:
a receiver configured to receive a data stream including the video data;
a preference data obtainer configured to obtain preference data, wherein the preference data indicate a selected competitor participating in the sport event;
a category identifier obtainer configured to obtain a category identifier from a machine learning algorithm into which the video data is input, wherein the machine learning algorithm is trained to classify a scene represented in the video content into a category of a predetermined set of categories associated with the sport event, wherein the category identifier indicates the category into which the scene is classified;
an audio content file obtainer configured to obtain, based on the obtained category identifier and the obtained preference data, the audio content file from a prestored set of audio content files, wherein the audio content file provides audio content associated with the category of the scene and the preference data; and
a synchronizer configured to synchronize the audio content and the video content for synchronized play back
(Continued)

| category identifier | category | selected competitor | audio content | audio content file ID |
|---|---|---|---|---|
| 0 | Goal for A | A/B | Yeah!/No! | 0/1 |
| 1 | Goal for B | A/B | No!/Yeah! | 2/3 |
| 2 | Foul from A | A/B | No foul!/Yellow card! | 4/5 |
| 3 | Foul from B | A/B | Yellow card!/No foul! | 6/7 |
| ... | ... | ... | ... | ... | of the scene by a media player configured to play back the video content and the audio content file.

20 Claims, 8 Drawing Sheets

(51) Int. Cl.
*G06V 20/40* (2022.01)
*H04N 21/44* (2011.01)
*H04N 21/45* (2011.01)

(58) Field of Classification Search
CPC .. H04N 21/8456; G06V 10/764; G06V 20/42; G06V 10/82; G06V 20/44
USPC ............................................................ 386/201
See application file for complete search history.

(56) References Cited

U.S. PATENT DOCUMENTS

| | | | |
|---|---|---|---|
| 2011/0225515 A1 | 9/2011 | Goldman et al. | |
| 2016/0029094 A1 | 1/2016 | Cheung et al. | |
| 2016/0142767 A1 | 5/2016 | Shigeta et al. | |
| 2017/0150223 A9 | 5/2017 | Zaccone et al. | |
| 2018/0027307 A1 | 1/2018 | Ni et al. | |
| 2018/0095648 A1 | 4/2018 | Valdivia et al. | |
| 2019/0115045 A1* | 4/2019 | Jarvis | G10L 17/00 |
| 2020/0160878 A1* | 5/2020 | Heo | G10L 25/84 |
| 2020/0294365 A1* | 9/2020 | Moskowitz | G07F 17/3288 |
| 2021/0297779 A1 | 9/2021 | Hawke | |
| 2021/0390971 A1* | 12/2021 | Yu | G10L 25/48 |
| 2022/0091676 A1* | 3/2022 | Oishi | G06V 20/41 |
| 2022/0321944 A1* | 10/2022 | Hosseini | H04N 21/2335 |
| 2022/0383849 A1* | 12/2022 | Benedetto | A63F 13/215 |

OTHER PUBLICATIONS

WO 2022181859 PCT/KR2021/002503 Filed Date: Feb. 26, 2021 (Year: 2022).*
Rayome, "GroupWatch is Disney Plus' version of Netflix Party. Here's how it works", CNET, Available Online At: https://www.cnet.com/how-to/groupwatch-is-disney-plus-version-of-netflix-party-heres-how-it-works, Dec. 23, 2020, pp. 1-3.
Roettgers, "This Startup Wants You to Bring Your Headphones to the Movies", SoundFi, Available Online At: https://variety.com/2018/digital/news/soundfi-equalizer-2-binaural-sound-1202886609/, Jul. 26, 2018, 3 pages.
NTT, "Connect the enthusiasm between remote spectators", M02 Remote Spectator Assistance System, Available Online At: https://www.rd.ntt/_assets/pdf/e/forum/2020/M02_e.pdf, 2020, 1 page.
Sceenic, "Sceenic Company Presentation", Available Online At: www.sceenic.com, 13 pages.
Syncheck, "Superior second screen synchronization", Pioneering Video and Media Synchronization—HEAR360—Audio, Available Online At: https://hear360.io/syncheck, Retrieved from the net on: May 27, 2021, pp. 1-4.
Tok. TV, "Never watch sports alone", Available Online At: https://www.tok.tv/index.html, Jan. 10, 2018, 11 pages.
Yamaha Corporation, "Yamaha Reveals Remote Cheering System in Field Test Assisted by Two Professional Football Clubs in Japan", Available Online At: https://www.yamaha.com/en/news_release/2020/20052501/, May 25, 2020, pp. 1-8.

* cited by examiner

| category identifier | category | selected competitor | audio content | audio content file ID |
|---|---|---|---|---|
| 0 | Goal for A | A/B | Yeah!/No! | 0/1 |
| 1 | Goal for B | A/B | No!/Yeah! | 2/3 |
| 2 | Foul from A | A/B | No foul!/Yellow card! | 4/5 |
| 3 | Foul from B | A/B | Yellow card!/No foul! | 6/7 |
| ... | ... | ... | ... | ... |

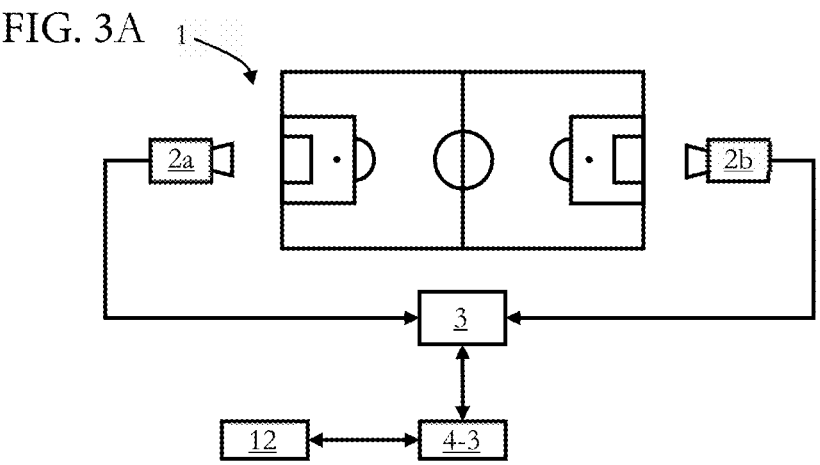
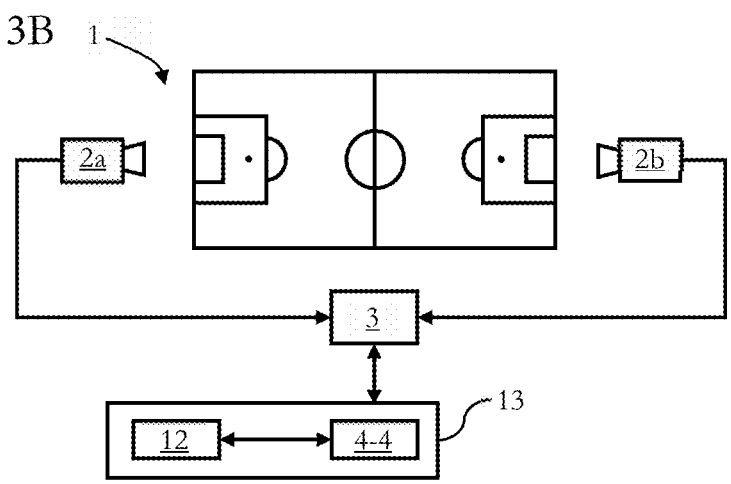
Fig. 3
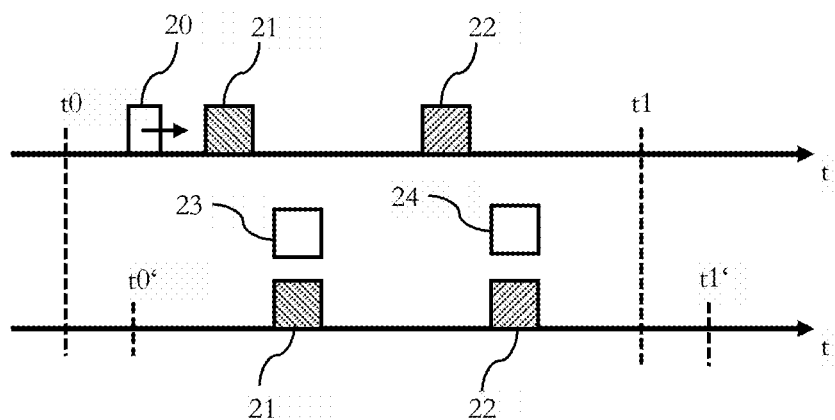
Fig. 4

80 ⟶

71 to 75 of the embodiment of Fig. 7 81

Transmitting the audio content and the video content to the media player associated with a first user and to a second media player associated with a second user such that the scene is played back substantially synchronized by the media player and the second media player, wherein the first user and the second user are included in a group of users having the same selected competitor indicated by the preference data 82

Transmitting an inaudible test audio content to the media player and the second media player 83

Receiving echo data representing a recorded echo of the inaudible test audio content from each of the media player and the second media player 84

Determining a data runtime for each of the media device and second media device 85

Transmitting the audio content and the video content to the media player and the second media player based on the data runtimes such that the scene is played back substantially synchronized by the media player and the second media player 86

Receiving first user audio content from the media player and second user audio content from the second media player 87

Transmitting, when the data runtimes are below a predetermined threshold, the first user audio content to the second media player and the second user audio content to the media player 88

Fig. 8

INFORMATION PROCESSING SYSTEM AND INFORMATION PROCESSING METHOD

CROSS-REFERENCE TO RELATED APPLICATION

The present application claims priority to European Patent Application No. 21190771.2, filed Aug. 11, 2021, the entire contents of which are incorporated herein by reference.

TECHNICAL FIELD

The present disclosure generally pertains to an information processing system for obtaining an audio content file for video data providing video content representing a sport event and a corresponding information processing method.

TECHNICAL BACKGROUND

Generally, many sport events are recorded with cameras and microphones at the location of the sport event and then made available, for example, via the Internet by a provider as a data stream so that any number of viewers (with a valid subscription) can watch the sport event, for example, at home on a media player.

In a pandemic crisis, for example, such sports events can typically not be attended by large crowds which may then be held without audience (e.g., "ghost games"). In such cases, the sound recorded at the location of the sport event does not include sound from the audience representing, e.g., excitation, joy, anger etc. which may reflect a fever of excitement with the competitors and a support of a particular competitor. Thus, the provided data stream representing the sport event cannot provide audio content representing the typical sound atmosphere of the sport event.

However, the typical sound atmosphere present at sport events may still be desired by many viewers, since it may provide a more immersive feeling increasing the attractiveness of watching sport events. Moreover, watching a sport event as a group may provide a shared experience desired by many people.

Although there exist techniques for providing a data stream representing a sport event, it is generally desirable to improve the existing techniques.

SUMMARY

According to a first aspect the disclosure provides an information processing system for obtaining an audio content file for video data providing video content representing a sport event, comprising:
  a receiver configured to receive a data stream including the video data;
  a preference data obtainer configured to obtain preference data, wherein the preference data indicate a selected competitor participating in the sport event;
  a category identifier obtainer configured to obtain a category identifier from a machine learning algorithm into which the video data is input, wherein the machine learning algorithm is trained to classify a scene represented in the video content into a category of a predetermined set of categories associated with the sport event, wherein the category identifier indicates the category into which the scene is classified;
  an audio content file obtainer configured to obtain, based on the obtained category identifier and the obtained preference data, the audio content file from a prestored set of audio content files, wherein the audio content file provides audio content associated with the category of the scene and the preference data; and
  a synchronizer configured to synchronize the audio content and the video content for synchronized play back of the scene by a media player configured to play back the video content and the audio content file.

According to a second aspect the disclosure provides an information processing method for obtaining an audio content file for video data providing video content representing a sport event, the information processing method comprising:
  receiving a data stream including the video data;
  obtaining preference data, wherein the preference data indicate a selected competitor participating in the sport event;
  obtaining a category identifier from a machine learning algorithm into which the video data is input, wherein the machine learning algorithm is trained to classify a scene represented in the video content into a category of a predetermined set of categories associated with the sport event, wherein the category identifier indicates the category into which the scene is classified;
  obtaining, based on the obtained category identifier and the obtained preference data, the audio content file from a prestored set of audio content files, wherein the audio content file provides audio content associated with the category of the scene and the preference data; and
  synchronizing the audio content and the video content for synchronized play back of the scene by a media player configured to play back the video content and the audio content file.

Further aspects are set forth in the dependent claims, the following description and the drawings.

BRIEF DESCRIPTION OF THE DRAWINGS

Embodiments are explained by way of example with respect to the accompanying drawings, in which:

FIG. 3 schematically illustrates in a block diagram a third embodiment of an information processing system in FIG. 3A and a fourth embodiment of an information processing system in FIG. 3B;

FIG. 4 schematically illustrates in a timeline an embodiment of synchronizing audio content and video content for synchronized play back of a scene by a media player;

FIG. 8 schematically illustrates in a flow diagram a third embodiment of an information processing method;

DETAILED DESCRIPTION OF EMBODIMENTS

Figures 1, 2:
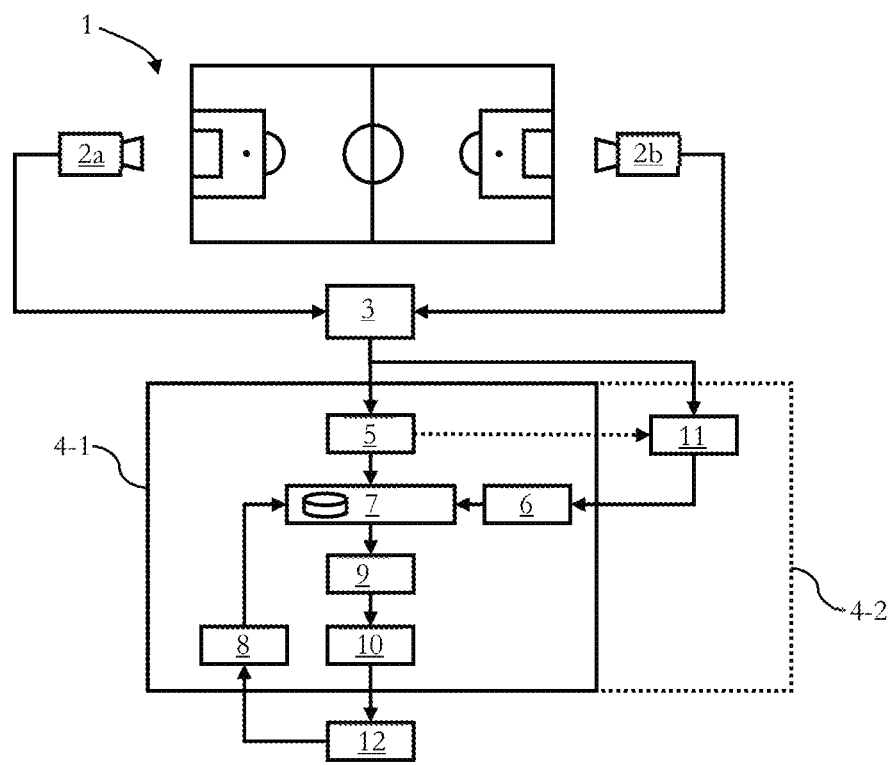
FIG. 1 schematically illustrates in a table an embodiment of an association of audio content files, categories of a scene and preference data.
FIG. 2 schematically illustrates in a block diagram a first and a second embodiment of an information processing system.

Before a detailed description of the embodiments under reference of FIG. 2 is given, general explanations are made.

As mentioned in the outset, generally, many sport events are recorded with cameras and microphones at the location of the sport event and then made available, for example, via the Internet by a provider as a data stream so that basically any number of viewers (optionally with a valid subscription) can watch the sport event, for example, at home on a media player.

In a pandemic crisis, for example, such sports events can typically not be attended by large crowds, which may then be held without audience (e.g., "ghost games"). In such cases, the sound recorded at the location of the sport event does not include sound from the audience representing, e.g., excitation, joy, anger etc. which may reflect a fever of excitement with the competitors or a support of a particular competitor. Thus, the provided data stream representing the sport event cannot provide audio content representing the typical sound atmosphere of the sport event. The present disclosure is not limited to this scenario.

However, the typical sound atmosphere present at many sport events may still be desired by many viewers, since it may provide a more immersive feeling increasing the attractiveness of watching sport events.

Hence, it has been recognized that video content representing a sport event which is watched by a viewer on a media player may be augmented with audio content in order to enhance the viewer's experience, for example, in cases in which sports events are held without audience.

Moreover, it has been recognized that such audio content augmentation should be based on the context of a scene represented in the video content for increasing the realism of the audio content augmentation ("audio-in-audio"). It has further been recognized that the context of the scene should be interpreted basically in near real-time for live broadcasting of the sport event, which does not allow subsequent processing of the video content by humans for overlaying audio content.

It has further been recognized that the video data providing video content from a data stream representing the sport event should be monitored, for example, by an artificial intelligence (e.g., a neural network), which classifies the scene into a category associated with the sport event such that the audio content augmentation is based on the category.

For instance, when a football (soccer) game gets more exciting (e.g., players or ball in the penalty box) or an increasingly long rally in tennis is represented in the scene, the scene may be classified as "exciting" and an audio content may be selected or generated which is associated with the "exciting" category.

Additionally, it has been recognized that the viewer (e.g., user of a media player) may (previously) select a side, for example, team A or team B (or neutral to both teams) and that the audio content augmentation should be based thereon, for example, when team A scores the audio content should include a sound of support for the selected side (selected competitor).

It has further been recognized that the audio content and the video content should be synchronized for synchronized play back of the audio augmented scene to provide a seamlessly integrated augmentation in a timely, synchronized way without obvious delay or shifts with respect to the video content timeline.

Hence, some embodiments pertain to an information processing system for obtaining an audio content file for video data providing video content representing a sport event, including:
 a receiver configured to receive a data stream including the video data;
 a preference data obtainer configured to obtain preference data, wherein the preference data indicate a selected competitor participating in the sport event;
 a category identifier obtainer configured to obtain a category identifier from a machine learning algorithm into which the video data is input, wherein the machine learning algorithm is trained to classify a scene represented in the video content into a category of a predetermined set of categories associated with the sport event, wherein the category identifier indicates the category into which the scene is classified;
 an audio content file obtainer configured to obtain, based on the obtained category identifier and the obtained preference data, the audio content file from a prestored set of audio content files, wherein the audio content file provides audio content associated with the category of the scene and the preference data; and
 a synchronizer configured to synchronize the audio content and the video content for synchronized play back of the scene by a media player configured to play back the video content and the audio content file.

The information processing system may be based on or may be implemented on a computer, a server, a cloud service, or the like. The information processing system may be embedded in a media device such as a television, a home entertainment system (e.g., including a television, a gaming console, a receiver box of a provider, a camera, a microphone, a speaker etc.), a mobile device or the like. The information processing system may be based on or may be implemented based on a distributed architecture, for example, distributed across a server, a cloud service, or the like and a media device such that some of its functions are performed by a server or the like and some of its functions are performed by the media device.

Generally, the information processing system includes circuitry configured to achieve the functions as described herein. The circuitry may be based on or may be implemented based on a distributed architecture, for example, distributed across a server, a cloud service, or the like and a media device.

The circuitry may be based on or may include or may be implemented as integrated circuitry logic or may be implemented by one or more CPUs (central processing unit), one or more application processors, one or more graphical processing units (GPU), one or more machine learning units such as tensor processing unit (TPU), one or more microcontrollers, one or more FPGAs (field programmable gate array), one or more ASICs (application specific integrated circuit) or the like.

The functionality may be implemented by software executed by a processor such as an application processor or the like. The circuitry may be based on or may include or may be implemented by typical electronic components configured to achieve the functionality as described herein. The circuitry may be based on or may include or may be implemented in parts by typical electronic components and integrated circuitry logic and in parts by software.

The circuitry may include a communication interface configured to communicate and exchange data with a computer or processor (e.g. an application processor or the like) over a network (e.g. the Internet) via a wired or a wireless connection such as WiFi®, Bluetooth® or a mobile telecommunications system which may be based on UMTS, LTE, ultra-low latency 5G or the like (and implements corresponding communication protocols).

The circuitry may include data storage capabilities to store data such as memory which may be based on semiconductor storage technology (e.g. RAM, EPROM, etc.) or magnetic storage technology (e.g. a hard disk drive) or the like.

The receiver, the preference data obtainer, the category identifier obtainer, the audio content file obtainer and the synchronizer may be based on or may be implemented by the circuitry to achieve the functions as described herein as hardware and/or software code components.

Each of the receiver, the preference data obtainer, the category identifier obtainer, the audio content file obtainer and the synchronizer may be based on or may be implemented by a circuitry, as described herein, to achieve the functions as described herein as hardware and/or software code components.

Generally, the information processing system obtains an audio content file which provides audio content for augmenting video content representing a sport event with the audio content ("audio-in-audio") for enhancing the user's experience, for example, in cases in which sports events are held without audience.

The audio content file can be played back by a media player.

In some embodiments, the audio content file includes one or more short audio content files or audio content segments (e.g., like MPEG DASH ("Dynamic Adaptive Streaming over HTTP") segments). The one or more short audio content files may be concatenated together by instructions to read a playlist of the short audio content files.

In some embodiments, the audio content file is assembled, for example at a server, from multiple audio content files played contemporaneously so as to produce a number of overlapping sounds. This may enhance realism, may save transmission bandwidth and/or may require less intensive processing on the media player.

In some embodiments, the multiple audio content files are received and played back contemporaneously on the media player. The audio content files, for example, at the server or the media player may start at different times and/or may have differing durations. The server or the media player may fully or partially loop the audio content file, if it becomes apparent from the video content that the scene is longer than the audio content file. Appropriate blending of the audio may be applied by the server or the media player to make a loop less apparent. Further, in case of predefined audio files, some randomization may be applied to avoid an unnatural repetition of the same sounds. Various filters or machine learning methods exist to do so.

In some embodiments, the audio content file(s) is(are) pre-transmitted to the media player and stored, for example, in a local storage of the media player. In such embodiments, for example, the category identifier indicates which audio content file is to be played back, which is retrieved from the local storage of the media player for play back. This may save transmission bandwidth and/or reduce latency.

The media player may be a media device or a software or hardware on or in a media device for processing audio and video data. The audio content may be understood as the information content that addresses the user/viewer in the form of sound with a specific meaning associated with the scene in the sport event to the user.

The video content may be understood as the information content that addresses the user/viewer in the form of a series of image frames, which may include a series of scenes. The scene may be a subset of the video content (e.g., a series of consecutive image frames) with specific meanings to the user (e.g., a goal scene, a rule infringement scene, etc.).

The sport event may be a football game, a basketball game, a tennis game, a race car event, or the like in which a finite number of competitors compete against each other either as individuals or teams.

The sport event may be a live event. Typically, such events are broadcast live, which is a particular challenge for real-time processing. Otherwise, offline processing may take place.

Moreover, sport in the context of the present disclosure may include games with a competitive element such as chess, puzzles, quizzes, e-sports and card games such as bridge. Additionally, sports may, for example, include opposing teams competing against the clock (such as downhill skiing), or competing based on scoring by judging criteria such as diving or figure skating.

Hence, the video data (providing the video content representing the sport event) may be generated by one or more cameras at the location of the sport event which is then provided as a data stream, for instance, by a provider to the information processing system.

However, the present disclosure is not limited to pure sport events, for example, the video content may also represent an event such as a circus show or a concert or the like.

The information processing system receives the data stream including the video data.

The information processing system further obtains preference data, wherein the preference data indicate a selected competitor participating in the sport event. Thereby, audio content can be based on user preference.

In some embodiments, the preference data is obtained from the media player.

The preference data may be obtained in advance, for example, the provider may provide metadata (e.g., teams participating, start time, etc.) about a sport event based on which the user may select a competitor (e.g., via a touch operation, remote control, etc.). The preference data may be predetermined, for example, the user may set a list of competitors which may be stored on the media device or an associated device such as a companion screen device. The user may select from preference data in a Graphical User Interface. Generally, the competitor may be a team, a player, a race car driver, or the like.

In some embodiments, the preference data may be generated by a machine learning algorithm, for example by monitoring audio reactions from users and/or by monitoring for example camera or time-of flight sensor movements of viewers. Alternatively, sensory data captured by wearables could be used to infer the preference settings for a user, e.g., a smartwatch could track the heartbeat or shaking motion of the arm of the user. For example, if a viewer cheers, gets up from their seat raises their arms, in response to a particular even in the sports content, it may be determined with respect to prestored scenarios/data that particular preference data is to be assigned via a machine learning algorithm.

As mentioned above, the audio content should be based on the context of a scene represented in the video content for increasing the realism of the audio content augmentation ("audio-in-audio") and should be interpreted basically in near real-time for live broadcasting of the sport event.

Hence, the information processing system further obtains a category identifier from a machine learning algorithm into which the video data is input, wherein the machine learning algorithm is trained to classify a scene represented in the video content into a category of a predetermined set of categories associated with the sport event, wherein the category identifier indicates the category into which the scene is classified.

In some embodiments, a human operator classifies the scenes represented in the video content into categories of the predetermined set of categories associated with the sport event.

In some embodiments, a human operator assists the machine learning algorithm in the classification of the scenes, wherein the scene represented in the video content is classified into a category of the predetermined set of categories associated with the sport event based on the classification of the machine learning algorithm and a classification of the human operator.

For example, a sound artists per competitor team may select manually the audio content files, wherein the sound artists may be assisted by the machine learning algorithm.

The category identifier may be based on one or more bits for indicating a category into which a scene represented in the video content is classified by the machine learning algorithm. The category is one of a predetermined set of categories associated with the sport event. For example, for football (soccer), the predetermined set of categories may include goal, foul, offside, penalty kick, etc. For example, for tennis, the predetermined set of categories may include point, out, long rally, net, set/match ball, etc.

The machine learning algorithm may be a neural network, a support vector machine (SVM), a logistic regression, a decision tree, etc.

The machine learning algorithm may be implemented or may run on the media player or a cloud server. The machine learning algorithm may be implemented or may run on a third party server which provides, for example, artificial intelligence services such as inference by a trained machine learning algorithm.

The machine learning algorithm may be trained based on prelabeled data for a sport event including a plurality of games, races, etc. in which scenes are classified. The machine algorithm may determine a probability that a scene belongs to a certain category and may classify the scene based thereon.

The machine learning algorithm may determine the scene from a sequence of frames or audio inputs recorded directly at the event. For example, there is a sequence of frames that makes up a point in a tennis match. This may be partitioned into scenes by the machine learning algorithm including, for example, scene 1: serve and return, scene 2: base line rallies, scene 3: cross court rallies, scene 4: drop shot and net play, scene 5: lob and smash, scene 6: umpire calling point and return to service line. Thus, for example, the machine learning algorithm may classify short scene 1-6 individually and may classify the longer point scene based on the short scenes 1-6.

The machine learning algorithm may operate with respect to training data on aspects like position of ball or players with respect to the court, speed of motion of ball, sound, player movements. The machine learning algorithm may also operate based on how the camera footage is controlled, such as use of zoom, pan, switch to another camera view. This may be based on external decisions by an automated or human video operator.

The information processing system further obtains, based on the obtained category identifier and the obtained preference data, the audio content file from a prestored set of audio content files, wherein the audio content file provides audio content associated with the category of the scene and the preference data. In some embodiments, the audio content file may be an advertisement selected based on the category identifier and/or preference data. For example, an advertisement related to the team or home location or team sponsors when a goal is scored is obtained and played back.

For enhancing the general understanding of the present disclosure, an embodiment of an association of audio content files, categories of a scene and preference data are discussed in the following under reference of FIG. 1, where the embodiment is schematically illustrated in a table.

In the first column, the category identifier is illustrated which is a positive integer indicating the category into which a scene may be classified.

In the second column, the categories are illustrated which are here for the sake of illustration only four categories associated with a football (soccer) game: Goal for A, Goal for B, Foul from A and Foul from B. Of course, there may be any number of categories (which may depend on the sport event) as also illustrated by the dots in the last row.

In the third column, the selected competitor is indicated which may be A or B.

In the fourth column, the audio content associated with the category of the scene and the preference data is illustrated. For example for category "Goal for A", the audio content includes sound of support for the selected competitor such as "Yeah!" when team A scored a goal and team A was selected and "No!" when team A scored a goal and team B was selected. For example for category "Foul from A", the audio content includes sound of support for the selected competitor such as "No foul!" when team A fouled and team A was selected and "Yellow Card!" when team A fouled and team B was selected.

Hence, in some embodiments, the audio content includes sound of support for the selected competitor. In some embodiments, the audio content further includes sound of support for an opposing competitor of the selected competitor with less volume. In some embodiments, the audio content file is in different languages for A or B.

In the fifth column, an audio content file identifier is illustrated indicating the audio content file corresponding to the audio content which is associated with the category of the scene and the preference data. Some audio content files may be identical, for example, here, "0" and "3" for the sake of illustration only (also, e.g., "1" and "2", "5" and "6", "4" and "7").

Returning to the general explanations, it has been recognized that, when the audio content file is obtained, the audio content and the video content should be synchronized for synchronized play back of the scene increasing realism of the audio augmentation.

Hence, the information processing system synchronizes the audio content and the video content for synchronized play back of the scene by the media player. The audio content and the video content may be synchronized based on time stamps in the video data. For example, the machine learning algorithm may provide a time stamp corresponding to the time stamps in the video data, for instance, for each classified scene the time stamp is obtained from the video data and attached to the category identifier.

It has further been recognized that the sound from the location of the sport event may increase classification accuracy of the scenes, for example, due to cheering or sound made by the player(s), or any spectator present, or the coach(es) or the like. Moreover, the voice of a commentator may increase classification accuracy.

Thus, in some embodiments, the data stream includes audio data providing second audio content including recorded sound from a location of the sport event, and the machine learning algorithm is further trained to classify the scene represented in the video content further based on the audio data. In some embodiments, the second audio content includes sound from a commentator of the sport event.

The machine learning algorithm may further be trained based on prelabeled data for a sport event including a plurality of games, races, etc. in which sound from the location of the sport event is classified into categories associated with the sport event.

In some embodiments, the data stream includes audio data providing second audio content including recorded sound from a location of the sport event and the information processing system synchronizes the audio content, the second audio content and the video content for synchronized play back by the media player. The synchronization may be based on time stamps, as mentioned above.

In some embodiments, the information processing system further includes a volume indicator obtainer configured to obtain, based on a probability with which the scene is classified into the category, a volume indicator, wherein the volume indicator indicates a volume with which the audio content is to be played back by the media player.

The volume indicator obtainer may be based on or may be implemented by the circuitry to achieve the functions as described herein.

In some embodiments, the volume of the audio content continuously increases with the beginning of the scene up to a maximum and then decreases towards the end of the scene.

It has further been recognized that for sport events without audience, the competitors may desire sound of support from remote audience. Generally, the user's media device may have a microphone to record the voice of the user or the user's sound such that the user's voice or sound may be fed back to a speaker at the location of the sport event. The microphone may be the microphone of a video camera. There may be an upload filter which filters utterances of the users. There may be a filter which filters out the TV audio for example to prevent audio feedback disturbances from being generated. In some embodiments such filtering may be performed at the server where the TV audio signal is known and removed from the audio signals captured by the microphone, for example by correlating the signals and cancelling the known TV audio signal by inverting it. In some embodiments correlating the known TV audio signal at the server with that captured by the microphone may give an indication of the data runtimes described below and allow the data runtime to be compensated for.

It has further been recognized that the audio content should only be fed back when the data runtimes are within a predetermined limit, since when the user watches a scene, it takes some time for the user audio content to be processed for output by a speaker at the location of the sport event.

Hence, in some embodiments, the information processing system receives user audio content from the media player and further includes a transmitter that is further configured to transmit, when a time delay between the second audio content and the user audio content is below a predetermined threshold, the user audio content to a speaker at the location of the sport event.

The transmitter may be based on or may be implemented by the circuitry to achieve the functions as described herein.

Moreover, it has been recognized that user grouping should be supported for creating a shared experience. The users (e.g., users of separate media devices) may form a group of like-minded viewers, for example, the users may have selected the same competitor to support or may have created a friend group or supporter group in advance. The users may select via a User Interface, such as a Graphical User Interface or the like, for example, which participants or groups can participate in user audio content sharing such that selective blocking is enabled, for instance, when chanting is inappropriate or the like.

In some embodiments, the viewership at two or more sports bars or more generally venues where like-minded spectators congregate is connected by common preference data.

For creating the shared experience, a limited subset of users may communicate with each other while watching the sport event. For example, the users may share voice or video recorded at the user's location with other users by augmenting it on the audio content or the video content of the other users, respectively.

Hence, in some embodiments the media player is configured to record a sound representing user audio content at the location of the media player (e.g., by a microphone) which is then transmitted to the information processing system. In some embodiments, the media player is configured to record a video representing user video content at the location of the media player (e.g., by a camera) which is then transmitted to the information processing system. Thereby, a feeling of togetherness may be created when user audio content and user video content is shared in a group of users associated with different media players.

Thus, in some embodiments, a first user and a second user are included in a group of users having the same selected competitor indicated by the preference data, and the information processing system further includes a transmitter configured to transmit the audio content and the video content to the media player associated with the first user and to a second media player associated with the second user such that the scene is played back substantially synchronized by the media player and the second media player.

The transmitter may be based on or may be implemented by the circuitry to achieve the functions as described herein.

In some embodiments, the first and the second media player include a plurality of speakers at different locations and each speaker of the plurality of speakers plays back different audio content ("spatial audio"). For example, the user of the media player may place the audio content on a first speaker in a first corner of a room and may place the user audio content on a second speaker in a second corner of the room.

The synchronized play back of the scene allows users at different locations to watch the same scene of the sport event at substantially the same time. Thereby, sharing of voice (user audio content) and video (user video content) may be facilitated when the data runtimes between different locations are within a predetermined limit.

For example, in some embodiments, the data runtime includes the time period required for capturing the user audio content, transmitting it over a network to a second media player and playing back the user audio content on the second media player. For example, in some embodiments, the data runtime includes the time period required for transmitting captured user audio content over a network to a second media player. For example, in some embodiments, the data runtime includes the time period required for capturing the user audio content and transmitting it over the network to, for example, a (cloud) server.

It has been recognized that the synchronized play back of the scene can be achieved by transmitting the video and audio content to each media player based on data runtimes.

Hence, in some embodiments, the information processing system transmits a test audio content to the media player and the second media player. The test audio content may be transmitted periodically or event-based, for example, when another user joins the group of users.

The test audio content may be a characteristic (short) sound. For example, the characteristic (short sound) may be played back when another user joins the group of users or the like.

The test audio content may include an audio watermark (e.g., audio modulation where sample frequencies are slightly changed) which carries a payload of a unique (or quasi-unique) user or user group identifier.

The test audio content may be an inaudible test audio content in a frequency range which cannot be heard by humans (and animals in some embodiments) and may have a characteristic pattern.

The test audio content is, in such embodiments, output by a speaker of the media player and the echo of the test audio content is recorded to generate echo data which are transmitted by the media player to the information processing system.

In such embodiments, the information processing system receives echo data representing a recorded echo of the test audio content from each of the media player and the second media player.

In such embodiments, the information processing system further includes a data runtime determinator configured to determine a data runtime for each of the media device and second media device. The data runtime determinator may be based on or may be implemented by the circuitry to achieve the functions as described herein.

In such embodiments, the information processing system transmits the audio content and the video content to the media player and the second media player based on the data runtimes such that the scene is played back substantially synchronized by the media player and the second media player.

In some embodiments, the user can capture the video with a smartphone and upload it to a cloud or to a local device, which augments the audio streams. In such embodiments, the device may detect a mismatch of augmented audio to the video frames and apply correction methods, e.g., postponing video frames artificially by the detected lag duration.

Thus, also the audio processing times by the media players are taken into account for the synchronization such that a high degree of synchronization may be achieved. The synchronization may be performed regularly. For example, since processing delays, buffers etc. may change over time.

As mentioned above, sharing of voice and video may be facilitated when the data runtimes between different locations are within a predetermined limit, since otherwise the audio content from a different user may be related to a scene which is already over which may be a disturbing feature.

Thus, in some embodiments, the information processing system receives first user audio content from the media player and second user audio content from the second media player and the information processing system transmits, when the data runtimes are below a predetermined threshold, the first user audio content to the second media player and the second user audio content to the media player.

Some embodiments pertain to an information processing method for obtaining an audio content file for video data providing video content representing a sport event, the information processing method including:
  receiving a data stream including the video data;
  obtaining preference data, wherein the preference data indicate a selected competitor participating in the sport event;
  obtaining a category identifier from a machine learning algorithm into which the video data is input, wherein the machine learning algorithm is trained to classify a scene represented in the video content into a category of a predetermined set of categories associated with the sport event, wherein the category identifier indicates the category into which the scene is classified;
  obtaining, based on the obtained category identifier and the obtained preference data, the audio content file from a prestored set of audio content files, wherein the audio content file provides audio content associated with the category of the scene and the preference data; and
  synchronizing the audio content and the video content for synchronized play back of the scene by a media player configured to play back the video content and the audio content file.

The information processing method may be performed by the information processing system as described herein.

The methods as described herein are also implemented in some embodiments as a computer program causing a computer and/or a processor to perform the method, when being carried out on the computer and/or processor. In some embodiments, also a non-transitory computer-readable recording medium is provided that stores therein a computer program product, which, when executed by a processor, such as the processor described above, causes the methods described herein to be performed.

Returning to FIG. 2, a first and a second embodiment of an information processing system 4-1 and 4-2 are discussed under reference of FIG. 2 in the following, which schematically illustrates the first and the second embodiment of the information processing system.

A sport event 1, here a football (soccer) game, is recorded by cameras 2a and 2b which are configured to generate video data providing video content representing the sport event 1. Moreover, the cameras 2a and 2b include microphones which are configured to generate audio data providing sound from the location of the sport event 1.

The audio and video data are obtained by a provider 3 which provides at least the video data as a data stream to the information processing system 4-1 or the information processing system 4-2.

The information processing system 4-1 includes a receiver 5, a category identifier obtainer 6, an audio content file obtainer 7, a preference data obtainer 8, a synchronizer 9 and a transmitter 10.

The information processing device 4-1 may be based on or may be implemented on a computer, a server, a cloud service, or the like. The information processing system 4-1 may be embedded in a media device such as a television, a home entertainment system (e.g., including a television, a gaming console, a receiver box of a provider, a camera, a microphone, a speaker etc.), a mobile device or the like. The information processing system may be based on or may be implemented based on a distributed architecture, for example, distributed across a server, a cloud service, or the like and a media device such that some of its functions are performed by a server or the like and some of its functions are performed by the media device.

The receiver 5 receives the data stream including the video data from the provider 3.

The category identifier obtainer 6 obtains a category identifier from a machine learning algorithm unit 11, the machine learning algorithm unit 11 includes a machine learning algorithm, here a neural network, into which the video data is input, wherein the machine learning algorithm is trained to classify a scene represented in the video content into a category of a predetermined set of categories associated with the sport event 1, wherein the category identifier indicates the category into which the scene is classified.

The audio content file obtainer 7 obtains preference data from the preference data obtainer 8 and obtains the category identifier from the category identifier obtainer 6.

The preference data obtainer 8 obtains preference data from a media player 12 configured to play back the video content and the audio content file, wherein the preference data indicate a selected competitor participating in the sport event 1.

The audio content file obtainer 7 obtains, based on the obtained category identifier and the obtained preference data, the audio content file from a prestored set of audio content files, wherein the audio content file provides audio content associated with the category of the scene and the preference data.

The synchronizer 9 synchronizes the audio content and the video content for synchronized play back of the scene by the media player 12.

The transmitter 10 transmits the audio content and the video content to the media player 12.

The information processing system 4-2 differs with respect to the information processing system 4-1 in that the information processing system 4-2 includes the machine learning algorithm unit 11.

FIG. 3 schematically illustrates in a block diagram a third embodiment of an information processing system 4-3 in FIG. 3A and a fourth embodiment of an information processing system 4-4 in FIG. 3B.

The information processing system 4-3 as depicted in FIG. 3A is a server for a cloud service which includes the receiver 5, the category identifier obtainer 6, the audio content file obtainer 7, the preference data obtainer 8, the synchronizer 9, the transmitter 10 and the machine learning algorithm unit 11.

The information processing system 4-4 as depicted in FIG. 3B is embedded in a media device 13 which includes the receiver 5, the category identifier obtainer 6, the audio content file obtainer 7, the preference data obtainer 8, the synchronizer 9, the transmitter 10 and the machine learning algorithm unit 11. Here, the media player 12 is also embedded in the media device 13.

FIG. 4 schematically illustrates in a timeline an embodiment of synchronizing audio content and video content for synchronized play back of a scene by a media player.

The upper timeline illustrates a time interval starting at t0 and ending at t1 in which the video data—providing video content representing a sport event such as sport event 1—is received in a data stream by an information processing system such as the information processing systems 4-1 to 4-5 as described herein. In the following, for example, the information processing system is the information processing system 4-3 of FIG. 3A.

The video data is input into a machine learning algorithm, as described herein, which is trained to classify a scene represented in the video content into a category of a predetermined set of categories associated with the sport event.

In this embodiment, the machine learning algorithm classifies the scene based on a series of consecutive frame images (or related audio sounds within the video stream) in a sliding time window 20 as illustrated in the upper timeline.

In the video content, for the sake of illustration, two scenes 21 and 22 are present which are a goal scene 21 and a foul scene 22.

The machine learning algorithm classifies the goal scene 21 based on the sliding time window 20 into the category "Goal for A" as shown in FIG. 1. The machine learning algorithm classifies the rule infringement scene 22 into the category "Foul from A" as shown in FIG. 1.

The machine learning algorithm typically requires some time to process the series of consecutive frame images in the sliding time window 20 for classifying scenes. Further, the information processing system 4-3 typically requires some time to obtain an audio content file from a prestored set of audio content files which provides audio content 23 and 24, as shown in the lower timeline, associated with the category of the scene and preference data. Additionally, the information processing system 4-3 typically requires some time to synchronize the audio content and the video content for synchronized play back of the scene by the media player 12.

Thus, the information processing system 4-3 transmits the synchronized audio content 23 and 24 and the video content in accordance with the lower timeline where the starting time is shifted from t0 to t0' and the ending time is shifted from t1 to t1' and the media player 12 obtains it accordingly.

The audio content 23 and 24 is synchronized with the scenes 21 and 22, respectively, represented in the video content based on time stamps such that audio content 23 is played back when scene 21 is played back by the media player 12 and such that audio content 24 is played back when scene 22 is played back by the media player 12.

In the following, a fifth embodiment of an information processing system 4-5 is discussed under reference of FIG. 5, which schematically illustrates in a block diagram the fifth embodiment of the information processing system 4-5. Moreover, a first embodiment of an information processing method 40—which is performed by the information processing system 4-5—is discussed under reference of FIG. 6.

Figure 5:
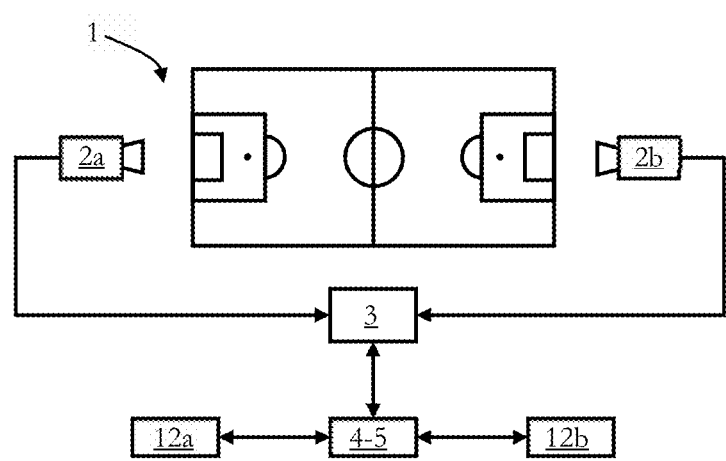
FIG. 5 schematically illustrates in a block diagram a fifth embodiment of an information processing system.

The information processing system 4-5 as depicted in FIG. 5 is a server for cloud service which includes the receiver 5, the category identifier obtainer 6, the audio content file obtainer 7, the preference data obtainer 8, the synchronizer 9, the transmitter 10 and the machine learning algorithm unit 11.

A first media player 12a is associated with a first user and a second media player 12b is associated with a second user, wherein the first user and the second user are included in a group of users having the same selected competitor participating in the sport event 1. The first and the second media player 12 are at different locations.

At 41, the provider 3 provides metadata about the sport event 1, for example, the competing teams, start time, end time, etc. The first user selects a competitor which generates preference data which are then transmitted by the first media player 12 to the information processing system 4-5 which obtains the preference data. The second user selects a competitor which generates preference data which are then transmitted by the second media player 12 to the information processing system 4-5 which obtains the preference data.

At 42, the information processing system 4-5 transmits an inaudible test audio content to the first media player 12a and the second media player 12b.

The first media player 12a receives the inaudible test audio content, processes it, plays it back and records an echo at 43a to generate echo data.

The second media player 12a receives the inaudible test audio content, processes it, plays it back and records an echo at 43b to generate echo data.

The first media player 12a transmits the echo data to the information processing system 4-5, which receives the echo data at 44a and determines a data runtime for the first media player 12a based on thereon.

The second media player 12b transmits the echo data to the information processing system 4-5, which receives the echo data at 44b and determines a data runtime for the second media player 12b based on thereon.

Here, as illustrated, the data runtime for the first media player 12a is lower than the data runtime for the second media player 12b.

Figure 6:
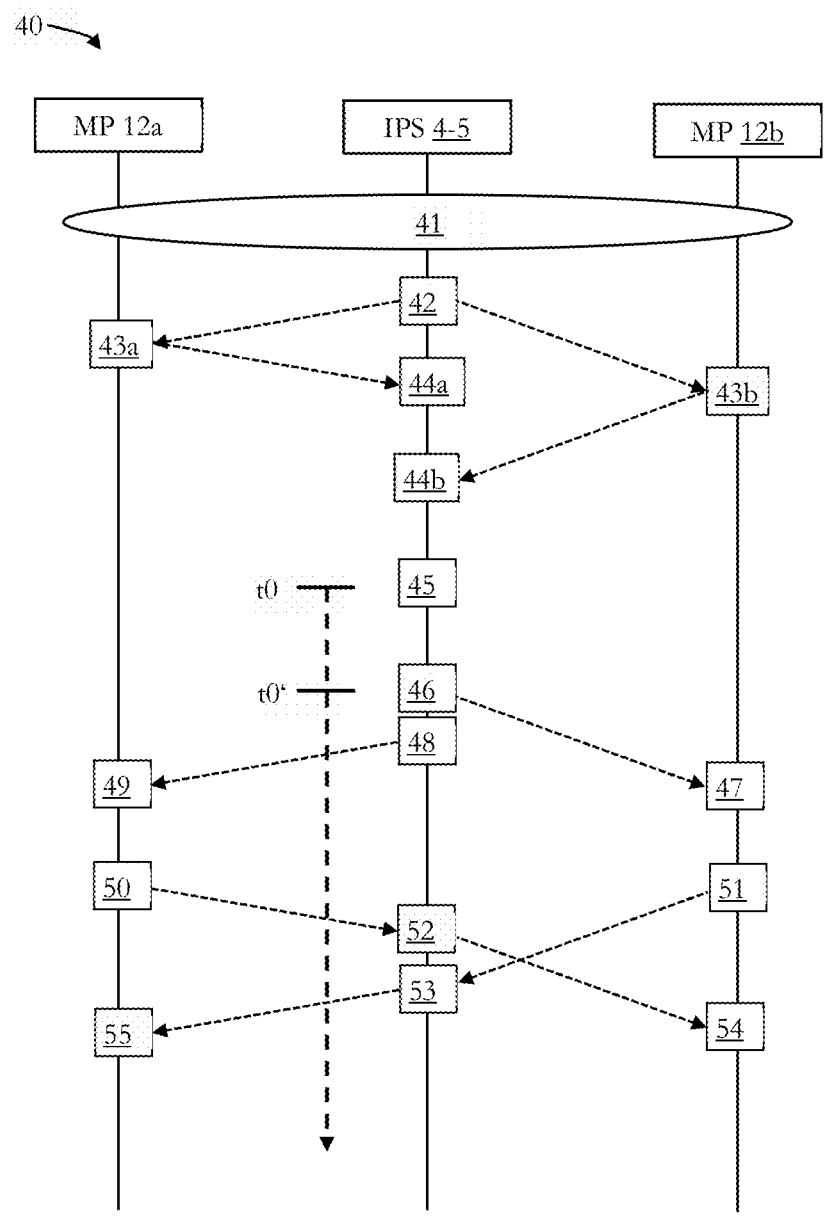
FIG. 6 schematically illustrates in a flow diagram a first embodiment of an information processing method.

At 45, also t0 in FIGS. 4 and 6, the information processing system 4-5 receives a data stream including video data providing video content representing the sport event 1. The information processing system 4-5 inputs the video data into a machine learning algorithm in the machine learning algorithm unit 11, wherein the machine learning algorithm is trained to classify a scene represented in the video content into a category of a predetermined set of categories associated with the sport event 1. When a scene is classified into a category of the predetermined set of categories, the information processing system 4-5 obtains a category identifier from the machine learning algorithm unit 11, wherein the category identifier indicates the category into which the scene is classified. When the category identifier is obtained, the information processing system 4-5 obtains, based on the category identifier and the preference data, an audio content file from a prestored set of audio content files, wherein the audio content file provides audio content associated with the category of the scene and the preference data.

As there it requires some processing time, for example, at least the time of the sliding window 20 of FIG. 4 plus processing time of the machine learning algorithm, the video data and audio data providing the audio content is transmitted at 46, which is time shifted from t0 to t0' (as also illustrated in FIG. 4).

Moreover, at 46, the video data and audio data providing the audio content is transmitted only to the second media player 12b, since the data runtime is larger for the second media player 12b. The second media player 12b receives it 47.

At 48, between 46 and 48, the video data and audio data providing the audio content is transmitted to the first media player 12a as well, wherein the delay between 46 and 48 compensates substantially the different data runtimes such that the first media player 12a receives it at 49 which is substantially the same time as 47.

Hence, the information processing system 4-5 transmits the audio content and the video content to the media player and the second media player based on the data runtimes such that the scene is played back substantially synchronized by the first media player 12a and the second media player 12b.

Moreover, for creating a shared experience, the first user and the second user exchange sound from their locations with each other. As the scene is played back substantially synchronized on both media players 12a and 12b, both users perceive the scene substantially at the same time and reactions (e.g., utterances) with respect to the scene occur substantially at the same time. Thus, such utterances can be exchanged for a shared experience when the overall data runtime between the two media players 12a and 12b via the information processing system 4-5 is within a predetermined time interval. In other words, when the data runtimes are below a predetermined threshold. Since otherwise the time delay between scene and reaction is too large which may be a disturbing feature when watching a sport event in a group.

Here, the overall data runtime between the two media players 12a and 12b via the information processing system 4-5 is within the predetermined time interval.

At 50, the first media player 12a transmits user audio content (e.g., utterances) to the information processing system 4-5, which receives it at 52. As the overall data runtime between the two media players 12a and 12b via the information processing system 4-5 is within the predetermined time interval, the user audio content from the first media player 12a is transmitted by the information processing system 4-5 to the second media player 12b, which receives it at 54.

At 51, the second media player 12a transmits user audio content (e.g., utterances) to the information processing system 4-5, which receives it at 53. As the overall data runtime between the two media players 12a and 12b via the information processing system 4-5 is within the predetermined time interval, the user audio content from the first media player 12a is transmitted by the information processing system 4-5 to the first media player 12b, which receives it at 55.

Generally, the information processing system 4-5 continuously transmits the video content and the audio content (based on machine learning) when a scene is classified into a category of the predetermined set of categories. Moreover, the information processing system 4-5 may regularly determine data runtimes and process user audio content for sharing with other users.

Figure 7:
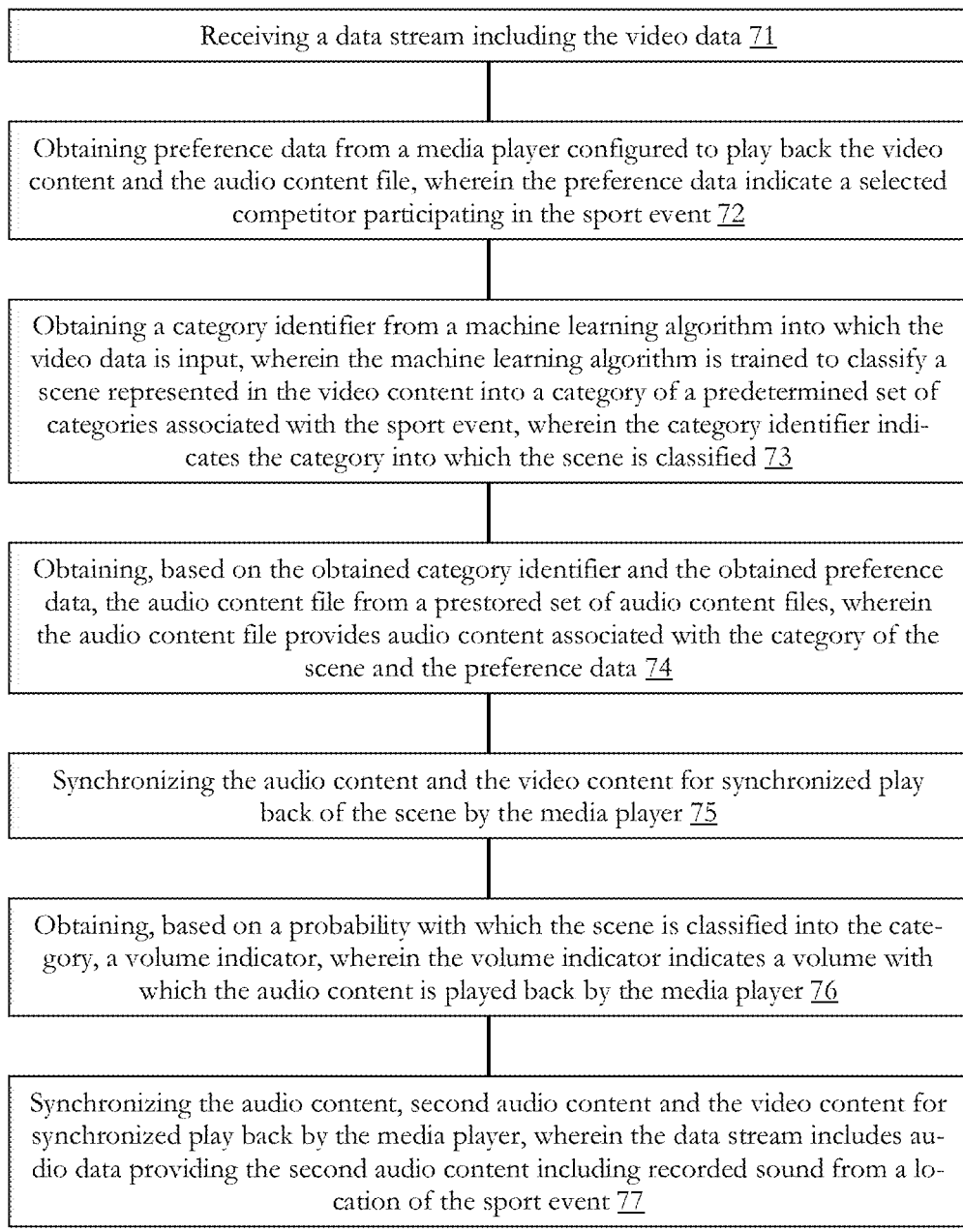
FIG. 7 schematically illustrates in a flow diagram a second embodiment of an information processing method.

FIG. 7 schematically illustrates in a flow diagram a second embodiment of an information processing method 70.

The information processing method 70 may be performed by the information processing system as described herein.

At 71, a data stream including the video data is received, as discussed herein.

At 72, preference data is obtained from a media player configured to play back the video content and the audio content file, wherein the preference data indicate a selected competitor participating in the sport event, as discussed herein.

At 73, a category identifier is obtained from a machine learning algorithm into which the video data is input, wherein the machine learning algorithm is trained to classify a scene represented in the video content into a category of a predetermined set of categories associated with the sport event, wherein the category identifier indicates the category into which the scene is classified, as discussed herein.

At 74, the audio content file is obtained from a prestored set of audio content files, based on the obtained category identifier and the obtained preference data, wherein the audio content file provides audio content associated with the category of the scene and the preference data, as discussed herein.

At 75, the audio content and the video content for synchronized play back of the scene by the media player is synchronized, as discussed herein.

At 76, a volume indicator is obtained, based on a probability with which the scene is classified into the category, wherein the volume indicator indicates a volume with which the audio content is played back by the media player, as discussed herein.

At 77, the audio content, second audio content and the video content is synchronized for synchronized play back by the media player, wherein the data stream includes audio data providing the second audio content including recorded sound from a location of the sport event, as discussed herein.

FIG. 8 schematically illustrates in a flow diagram a third embodiment of an information processing method 80.

The information processing method 80 may be performed by the information processing system as described herein.

At 81, 71 to 75 of the information processing method 70 of FIG. 7 is performed, which is incorporated herein by reference.

At 82, the audio content and the video content is transmitted to the media player associated with a first user and to a second media player associated with a second user such that the scene is played back substantially synchronized by the media player and the second media player, wherein the first user and the second user are included in a group of users having the same selected competitor indicated by the preference data, as discussed herein.

At 83, an inaudible test audio content is transmitted to the media player and the second media player, as discussed herein.

At 84, echo data representing a recorded echo of the inaudible test audio content from each of the media player and the second media player is received, as discussed herein.

At 85, a data runtime for each of the media device and second media device is determined, as discussed herein.

At 86, the audio content and the video content is transmitted to the media player and the second media player based on the data runtimes such that the scene is played back substantially synchronized by the media player and the second media player, as discussed herein.

At 87, first user audio content from the media player and second user audio content from the second media player is received, as discussed herein.

At 88, when the data runtimes are below a predetermined threshold, the first user audio content is transmitted to the second media player and the second user audio content is transmitted to the media player, as discussed herein.

Figure 9:
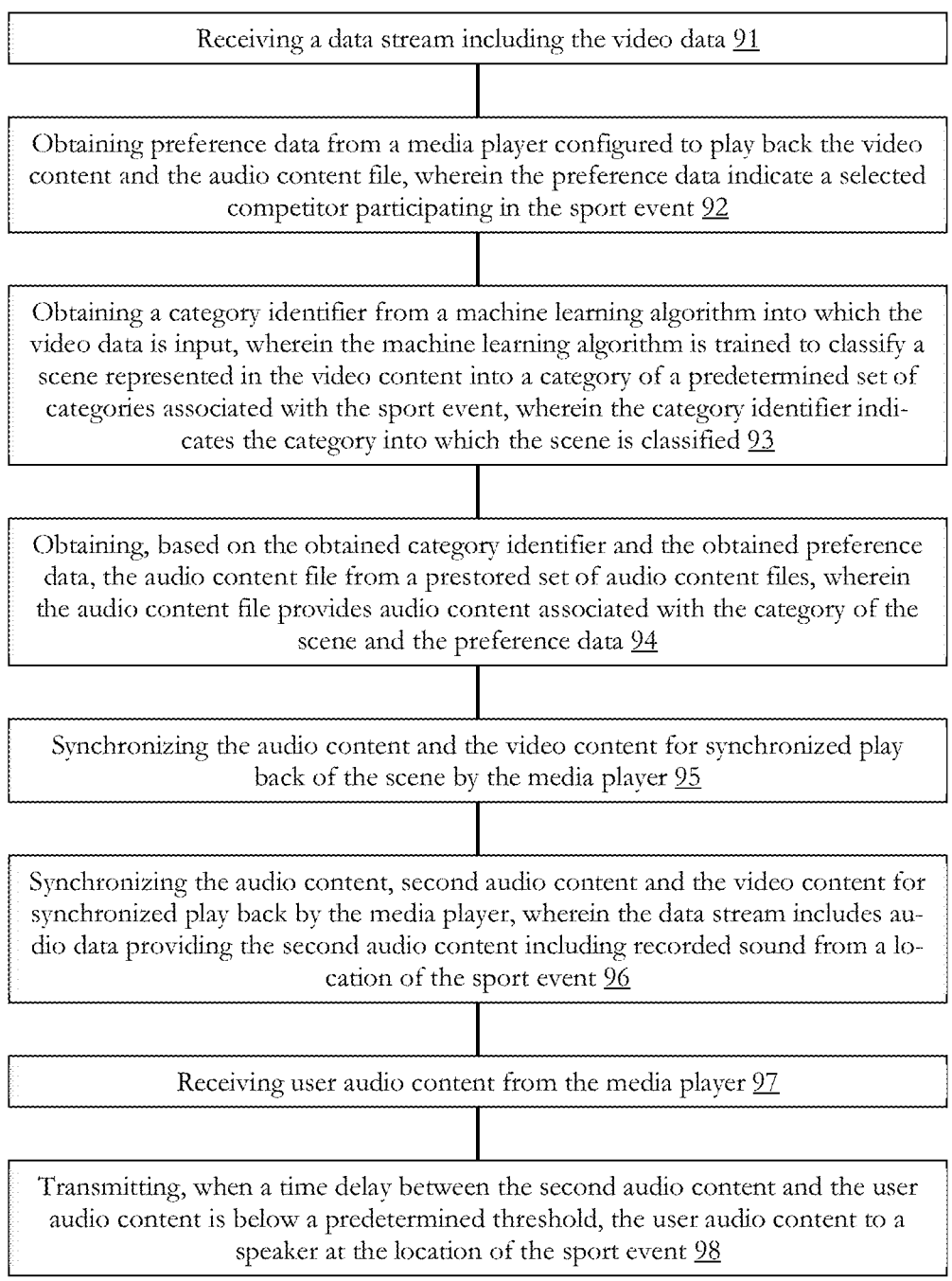
FIG. 9 schematically illustrates in a flow diagram a fourth embodiment of an information processing method.

FIG. 9 schematically illustrates in a flow diagram a fourth embodiment of an information processing method 90.

Here, 91 to 95 correspond to 71 to 75 of FIG. 7 which is incorporated herein by reference.

At 96, the audio content, second audio content and the video content is synchronized for synchronized play back by the media player, wherein the data stream includes audio data providing the second audio content including recorded sound from a location of the sport event, as discussed herein.

At 97, user audio content is received from the media player, as discussed herein.

At 98, when a time delay between the second audio content and the user audio content is below a predetermined threshold, the user audio content is transmitted to a speaker at the location of the sport event.

Figure 10:
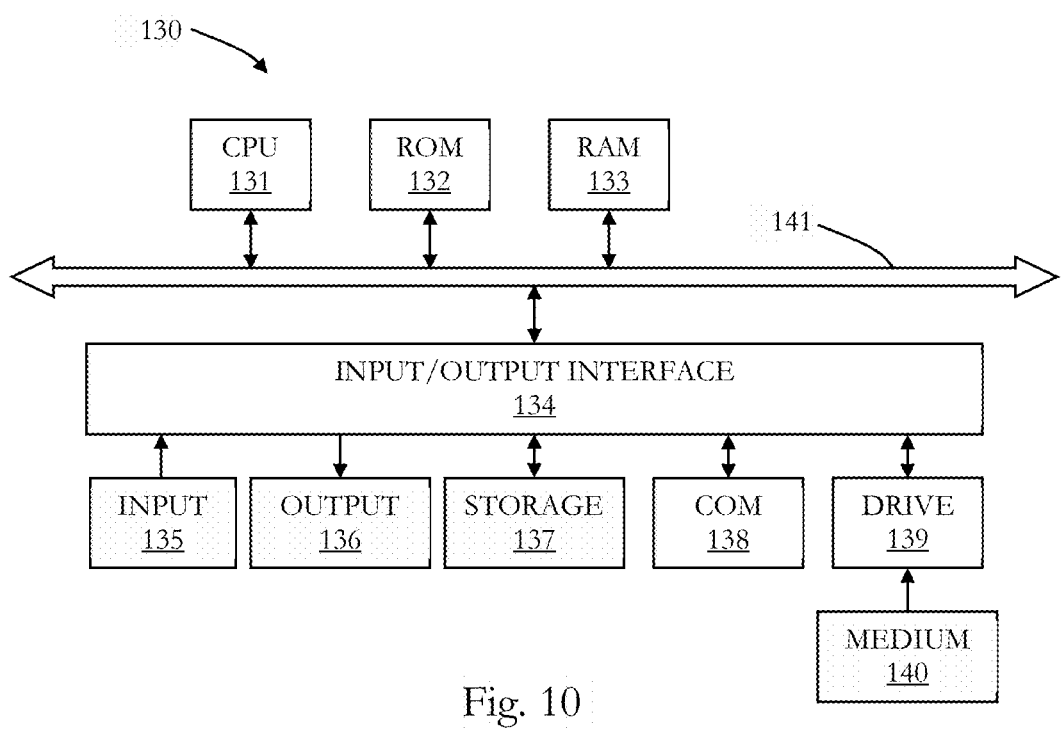
FIG. 10 schematically illustrates in a block diagram a general-purpose computer which can be used for implementing an information processing system.

FIG. 10 schematically illustrates in a block diagram a general-purpose computer 130 which can be used for implementing an information processing system.

The computer 130 can be implemented such that it can basically function as any type of information processing system as described herein. The computer has components 131 to 141, which can form a circuitry, such as any one of the circuitries of the information processing system as described herein.

Embodiments which use software, firmware, programs or the like for performing the methods as described herein can be installed on computer 130, which is then configured to be suitable for the concrete embodiment.

The computer 130 has a CPU 131 (Central Processing Unit), which can execute various types of procedures and methods as described herein, for example, in accordance with programs stored in a read-only memory (ROM) 132, stored in a storage 137 and loaded into a random access memory (RAM) 133, stored on a medium 140 which can be inserted in a respective drive 139, etc.

The CPU 131, the ROM 132 and the RAM 133 are connected with a bus 141, which in turn is connected to an input/output interface 134. The number of CPUs, memories and storages is only exemplary, and the skilled person will appreciate that the computer 130 can be adapted and configured accordingly for meeting specific requirements which arise, when it functions as a information processing system.

At the input/output interface 134, several components are connected: an input 135, an output 136, the storage 137, a communication interface 138 and the drive 139, into which a medium 140 (compact disc, digital video disc, compact flash memory, or the like) can be inserted.

The input 135 can be a pointer device (mouse, graphic table, or the like), a keyboard, a microphone, a camera, a touchscreen, etc.

The output 136 can have a display (liquid crystal display, cathode ray tube display, light emittance diode display, etc.), loudspeakers, etc.

The storage 137 can have a hard disk, a solid state drive and the like.

The communication interface 138 can be adapted to communicate, for example, via a wired connection or via a local area network (LAN), wireless local area network (WLAN), mobile telecommunications system (GSM, UMTS, LTE, NR (new radio protocol as in 5G) etc.), Bluetooth, infrared, etc.

It should be noted that the description above only pertains to an example configuration of computer 130. Alternative configurations may be implemented with additional or other sensors, storage devices, interfaces or the like. For example, the communication interface 138 may support other radio access technologies than the mentioned UMTS, LTE and NR.

When the computer 130 functions as an information processing system, the communication interface 138 can further have a respective air interface (providing e.g. E-UTRA protocols OFDMA (downlink) and SC-FDMA (uplink)) and network interfaces (implementing for example protocols such as S1-AP, GTP-U, S1-MME, X2-AP, or the like). The computer 130 is also implemented to transmit data in accordance with TCP. Moreover, the computer 130 may have one or more antennas and/or an antenna array. The present disclosure is not limited to any particularities of such protocols.

It should be recognized that the embodiments describe methods with an exemplary ordering of method steps. The specific ordering of method steps is however given for illustrative purposes only and should not be construed as binding.

Herein, "obtaining" may include, for example, sending from a first element to a second (receiving or obtaining) element, optionally based on some triggering condition or data or signal, or there may be a request from the second element to the first element before receiving or obtaining particular signals from the first element.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) An information processing system for obtaining an audio content file for video data providing video content representing a sport event, including:
   a receiver configured to receive a data stream including the video data;
   a preference data obtainer configured to obtain preference data, wherein the preference data indicate a selected competitor participating in the sport event;
   a category identifier obtainer configured to obtain a category identifier from a machine learning algorithm into which the video data is input, wherein the machine learning algorithm is trained to classify a scene represented in the video content into a category of a predetermined set of categories associated with the sport event, wherein the category identifier indicates the category into which the scene is classified;
   an audio content file obtainer configured to obtain, based on the obtained category identifier and the obtained preference data, the audio content file from a prestored set of audio content files, wherein the audio content file provides audio content associated with the category of the scene and the preference data; and
   a synchronizer configured to synchronize the audio content and the video content for synchronized play back of the scene by a media player configured to play back the video content and the audio content file.

(2) The information processing system of (1), wherein the data stream includes audio data providing second audio content including recorded sound from a location of the sport event, and wherein the machine learning algorithm is further trained to classify the scene represented in the video content further based on the audio data.

(3) The information processing system of (1) or (2), further including a volume indicator obtainer configured to obtain, based on a probability with which the scene is classified into the category, a volume indicator, wherein the volume indicator indicates a volume with which the audio content is to be played back by the media player.

(4) The information processing system of anyone of (1) to (3), wherein the audio content includes sound of support for the selected competitor.

(5) The information processing system of anyone of (1) to (4), wherein the data stream includes audio data providing second audio content including recorded sound from a location of the sport event, wherein the synchronizer is further configured to synchronize the audio content, the second audio content and the video content for synchronized play back by the media player.

(6) The information processing system of anyone of (2) to (5), wherein the second audio content includes sound from a commentator of the sport event.

(7) The information processing system of anyone of (1) to (6), wherein a first user and a second user are included in a group of users having the same selected competitor indicated by the preference data, and the information processing system further including a transmitter configured to transmit the audio content and the video content to the media player associated with the first user and to a second media player associated with the second user such that the scene is played back substantially synchronized by the media player and the second media player.

(8) The information processing system of (7), wherein:
   the transmitter is further configured to transmit a test audio content to the media player and the second media player;
   the receiver is further configured to receive echo data representing a recorded echo of the test audio content from each of the media player and the second media player;
   the information processing system further comprises a data runtime determinator configured to determine a data runtime for each of the media device and second media device; and
   the transmitter is further configured to transmit the audio content and the video content to the media player and the second media player based on the data runtimes such that the scene is played back substantially synchronized by the media player and the second media player.

(9) The information processing system of (8), wherein:
   the receiver is further configured to receive first user audio content from the media player and second user audio content from the second media player; and
   the transmitter is further configured to transmit, when the data runtimes are below a predetermined threshold, the first user audio content to the second media player and the second user audio content to the media player.

(10) The information processing system of anyone of (2) to (9), wherein:
   the receiver is further configured to receive user audio content from the media player; and further comprising:
   a transmitter configured to transmit, when a time delay between the second audio content and the user audio content is below a predetermined threshold, the user audio content to a speaker at the location of the sport event.

(11) An information processing method for obtaining an audio content file for video data providing video content representing a sport event, the information processing method including:
   receiving a data stream including the video data;
   obtaining preference data, wherein the preference data indicate a selected competitor participating in the sport event;
   obtaining a category identifier from a machine learning algorithm into which the video data is input, wherein the machine learning algorithm is trained to classify a scene represented in the video content into a category of a predetermined set of categories associated with the sport event, wherein the category identifier indicates the category into which the scene is classified;
   obtaining, based on the obtained category identifier and the obtained preference data, the audio content file from a prestored set of audio content files, wherein the audio content file provides audio content associated with the category of the scene and the preference data; and synchronizing the audio content and the video content for synchronized play back of the scene by a media player configured to play back the video content and the audio content file.

(12) The information processing method of (11), wherein the data stream includes audio data providing second audio content including recorded sound from a location of the sport event, and wherein the machine learning algorithm is further trained to classify the scene represented in the video content further based on the audio data.

(13) The information processing method of (11) or (12), further including:
obtaining, based on a probability with which the scene is classified into the category, a volume indicator, wherein the volume indicator indicates a volume with which the audio content is to be played back by the media player.

(14) The information processing method of anyone of (11) to (13), wherein the audio content includes sound of support for the selected competitor.

(15) The information processing method of anyone of (11) to (14), wherein the data stream includes audio data providing second audio content including recorded sound from a location of the sport event, and further including:
synchronizing the audio content, the second audio content and the video content for synchronized play back by the media player.

(16) The information processing method of anyone of (12) to (15), wherein the second audio content includes sound from a commentator of the sport event.

(17) The information processing method of anyone of (11) to (16), wherein a first user and a second user are included in a group of users having the same selected competitor indicated by the preference data, and further including:
transmitting the audio content and the video content to the media player associated with the first user and to a second media player associated with the second user such that the scene is played back substantially synchronized by the media player and the second media player.

(18) The information processing method of (17), further including:
transmitting a test audio content to the media player and the second media player;
receiving echo data representing a recorded echo of the test audio content from each of the media player and the second media player;
determining a data runtime for each of the media device and second media device; and
transmitting the audio content and the video content to the media player and the second media player based on the data runtimes such that the scene is played back substantially synchronized by the media player and the second media player.

(19) The information processing method of (18), further including:
receiving first user audio content from the media player and second user audio content from the second media player; and
transmitting, when the data runtimes are below a predetermined threshold, the first user audio content to the second media player and the second user audio content to the media player.

(20) The information processing method of anyone of (12) to (19), further including:
receiving user audio content from the media player; and
transmitting, when a time delay between the second audio content and the user audio content is below a predetermined threshold, the user audio content to a speaker at the location of the sport event.

(21) A computer program comprising program code causing a computer to perform the method according to anyone of (11) to (20), when being carried out on a computer.

(22) A non-transitory computer-readable recording medium that stores therein a computer program product, which, when executed by a processor, causes the method according to anyone of (11) to (20) to be performed.

(23) The information processing system of anyone of (1) to (10), wherein the preference data is obtained from the media player.

(24) The information processing method of anyone of (11) to (20), wherein the preference data is obtained from the media player.

The invention claimed is:

1. An information processing system for obtaining an audio content file for video data providing video content representing a sport event, comprising:
circuitry configured to:
receive a data stream including the video data;
obtain preference data, wherein the preference data indicates a selected competitor participating in the sport event;
obtain a category identifier from a machine learning algorithm into which the video data is input, wherein the machine learning algorithm is trained to classify a scene represented in the video content into a category of a predetermined set of categories associated with the sport event, wherein the category identifier indicates the category into which the scene is classified, wherein the predetermined set of categories includes a plurality of distinct predetermined occurrences that could occur within the sport event, and wherein the category is one of the distinct predetermined occurrences that could occur within the sport event into which the scene is classified:
obtain, based on the obtained category identifier and the obtained preference data, the audio content file from a prestored set of audio content files, wherein the audio content file provides audio content associated with the category of the scene and the preference data; and
synchronize the audio content and the video content for synchronized play back of the scene by a media player configured to play back the video content and the audio content file; and
delay transmission of the synchronized audio content and video content for a time corresponding to at least a time the machine learning algorithm takes to process a series of consecutive frame images of the video content to classify the scene.

2. The information processing system according to claim 1,
wherein the data stream includes audio data providing second audio content including recorded sound from a location of the sport event, and
wherein the machine learning algorithm is further trained to classify the scene represented in the video content further based on the audio data.

3. The information processing system according to claim 1,
wherein the circuitry is configured to obtain, based on a probability with which the scene is classified into the category, a volume indicator, and
wherein the volume indicator indicates a volume with which the audio content is to be played back by the media player.

4. The information processing system according to claim 1, wherein the audio content includes sound of support for the selected competitor.

5. The information processing system according to claim 1,
wherein the data stream includes audio data providing second audio content including recorded sound from a location of the sport event,
wherein the circuitry is configured to synchronize the audio content, the second audio content, and the video content for synchronized play back by the media player.

6. The information processing system according to claim 2, wherein the second audio content includes sound from a commentator of the sport event.

7. The information processing system according to claim 1,
wherein a first user and a second user are included in a group of users having the same selected competitor indicated by the preference data, and
wherein the circuitry is configured to transmit the audio content and the video content to the media player associated with the first user and to a second media player associated with the second user such that the scene is played back substantially synchronized by the media player and the second media player.

8. The information processing system according to claim 7, wherein the circuitry is configured to:
transmit a test audio content to the media player and to the second media player;
receive echo data representing a recorded echo of the test audio content from each of the media player and the second media player;
determine a data runtime for each of the test audio content at the media device and the test audio content at second media device based upon the received echo data; and
transmit the audio content and the video content to the media player and the second media player based on the data runtimes such that the scene is played back substantially synchronized by the media player and the second media player.

9. The information processing system according to claim 8, wherein the circuitry is configured to:
receive first user audio content from the media player and second user audio content from the second media player, and
transmit, when the data runtimes are below a predetermined threshold, the first user audio content to the second media player and the second user audio content to the media player.

10. The information processing system according to claim 2, wherein the circuitry is configured to:
receive user audio content from the media player; and
transmit, when a time delay between the second audio content and the user audio content is below a predetermined threshold, the user audio content to a speaker at the location of the sport event.

11. An information processing method for obtaining an audio content file for video data providing video content representing a sport event, the information processing method comprising:
receiving a data stream including the video data;
obtaining preference data, wherein the preference data indicate a selected competitor participating in the sport event;
obtaining a category identifier from a machine learning algorithm into which the video data is input, wherein the machine learning algorithm is trained to classify a scene represented in the video content into a category of a predetermined set of categories associated with the sport event, wherein the category identifier indicates the category into which the scene is classified, wherein the predetermined set of categories includes a plurality of distinct predetermined occurrences that could occur within the sport event, and wherein the category is one of the distinct predetermined occurrences that could occur within the sport event into which the scene is classified;
obtaining, based on the obtained category identifier and the obtained preference data, the audio content file from a prestored set of audio content files, wherein the audio content file provides audio content associated with the category of the scene and the preference data;
synchronizing the audio content and the video content for synchronized play back of the scene by a media player configured to play back the video content and the audio content file; and
delaying transmission of the synchronized audio content and video content for a time corresponding to at least a time the machine learning algorithm takes to process a series of consecutive frame images of the video content to classify the scene.

12. The information processing method according to claim 11,
wherein the data stream includes audio data providing second audio content including recorded sound from a location of the sport event, and
wherein the machine learning algorithm is further trained to classify the scene represented in the video content further based on the audio data.

13. The information processing method according to claim 11, further comprising:
obtaining, based on a probability with which the scene is classified into the category, a volume indicator,
wherein the volume indicator indicates a volume with which the audio content is to be played back by the media player.

14. The information processing method according to claim 11, wherein the audio content includes sound of support for the selected competitor.

15. The information processing method according to claim 11,
wherein the data stream includes audio data providing second audio content including recorded sound from a location of the sport event, and
wherein the method further comprises synchronizing the audio content, the second audio content, and the video content for synchronized play back by the media player.

16. The information processing method according to claim 12, wherein the second audio content includes sound from a commentator of the sport event.

17. The information processing method according to claim 11,
wherein a first user and a second user are included in a group of users having the same selected competitor indicated by the preference data, and
wherein the method further comprises transmitting the audio content and the video content to the media player associated with the first user and to a second media player associated with the second user such that the scene is played back substantially synchronized by the media player and the second media player.

18. The information processing method according to claim 17, further comprising:
transmitting a test audio content to the media player and the second media player;

receiving echo data representing a recorded echo of the test audio content from each of the media player and the second media player;

determining a data runtime for each of the test audio content at the media device and the test audio content at second media device based upon the received echo data; and transmitting the audio content and the video content to the media player and the second media player based on the data runtimes such that the scene is played back substantially synchronized by the media player and the second media player.

19. The information processing method according to claim 18, further comprising:

receiving first user audio content from the media player and second user audio content from the second media player; and transmitting, when the data runtimes are below a predetermined threshold, the first user audio content to the second media player and the second user audio content to the media player.

20. The information processing method according to claim 12, further comprising:

receiving user audio content from the media player; and transmitting, when a time delay between the second audio content and the user audio content is below a predetermined threshold, the user audio content to a speaker at the location of the sport event.

* * * * *